United States Patent [19]

Randall

[11] Patent Number: 4,697,078

[45] Date of Patent: Sep. 29, 1987

[54] METHOD FOR QUALITY CONTROL OF COUNTING LOGS

[75] Inventor: Russel R. Randall, Houston, Tex.

[73] Assignee: Western Atlas International, Inc., Houston, Tex.

[21] Appl. No.: 722,098

[22] Filed: Apr. 10, 1985

[51] Int. Cl.$^4$ .............................................. G01V 5/00
[52] U.S. Cl. ................................... 250/256; 250/270; 250/264
[58] Field of Search ................ 250/256, 270, 262, 264

[56] References Cited

U.S. PATENT DOCUMENTS

| | | | |
|---|---|---|---|
| 3,868,505 | 2/1975 | Jacobson et al. | 250/269 |
| 4,020,342 | 4/1977 | Smith, Jr. et al. | 250/270 |
| 4,137,450 | 1/1979 | Hopkinson | 250/264 |
| 4,223,218 | 9/1980 | Jacobson | 250/262 |
| 4,292,518 | 9/1981 | Johnstone | 250/262 |
| 4,317,034 | 2/1982 | Randall | 250/262 |
| 4,327,290 | 4/1982 | Plasek | 250/262 |
| 4,350,888 | 9/1982 | Peelman | 250/270 |
| 4,388,529 | 6/1983 | Peelman | 250/270 |
| 4,409,481 | 10/1983 | Smith, Jr. et al. | 250/270 |
| 4,423,323 | 12/1983 | Ellis et al. | 250/264 |
| 4,424,444 | 1/1984 | Smith, Jr. et al. | 250/270 |
| 4,445,003 | 4/1984 | Preeg et al. | 250/266 |
| 4,507,554 | 3/1985 | Hertzog et al. | 250/270 |
| 4,933,240 | 2/1984 | Seeman | 250/256 |

Primary Examiner—Carolyn E. Fields
Assistant Examiner—Richard Hanig
Attorney, Agent, or Firm—Patrick H. McCollum

[57] ABSTRACT

A generalized computer-based system and method for acquisition of nuclear well logging data. A feature of the present invention is the ability to provide time distribution spectra over the entire interval between source firings, such spectra including the gamma radiation produced from both the inelastic scattering and capture of neutrons from said neutron source. The spectra so generated may be analyzed and processed to derive parameters indicative of formation and borehole conditions, for example, a parameter sensitive to borehole geometry and a parameter sensitive to porosity. Certain parameters may be compared as an indication of the presence of gas in a fluid filled formation. Still further, a quantitative measure of the repeatability of the macroscopic thermal neutron absorption capture cross-section may be derived and used to control the weight of the capture cross-section filter.

14 Claims, 3 Drawing Figures

METHOD FOR QUALITY CONTROL OF COUNTING LOGS

BACKGROUND OF THE INVENTION

The present invention relates to hydrocarbon well logging systems and methods; more particularly, it relates to a computer-based system and method for acquisition, presentation, processing, and recording of nuclear hydrocarbon well logging data.

Well logging systems have been utilized in hydrocarbon exploration for many years. Such systems provide data for use by geologists and petroleum engineers in making many determinations pertinent to hydrocarbon exploration. In particular, the systems provide data for subsurface structural mapping, defining the lithology of subsurface formations, identifying hydrocarbon productive zones, and interpreting reservoir characteristics and contents. Many types of well logging systems exist which measure different formation parameters such as conductivity, travel time of acoustic waves within the formation and the like.

Still another class of systems seeks to measure incidence of nuclear particles on the well logging tool from the formation for purposes well known in the art. These systems take various forms, including those measuring natural gamma rays from the formation. Still other systems measure gamma rays in the formation caused by bursts of neutrons into the formation by a neutron source carried by the tool and pulsed at a preselected interval.

In these nuclear well logging systems, reliance is made upon the physical phenomenon that the magnitude of gamma rays given off by a nucleus resulting from natural radioactive decay or induced nuclear radiation is indicative of the presence of certain elements within the formation. In other words, formation elements will react in predictable ways, for example, when high energy neutrons on the order of 14.2 MeV collide with the elements' nuclei. Different elements in the formation may thus be identified from characteristic gamma ray energy levels released as a result of this neutron bombardment. Thus, the number of gamma rays at each energy level will be functionally related to the quantity of each element present in the formation such as the element carbon which is present in hydrocarbons. The presence of gamma rays at a 2.2 MeV energy level may for example, indicate the presence of hydrogen, whereas predominance of gamma rays having energy levels of 4.43 and 6.13 MeV, for example, may indicate the presence of carbon or oxygen.

Also, in these nuclear well logging systems, it is frequently useful to obtain data regarding the time spectral distributions of the occurrence of the gamma rays. Such data can yield extremely valuable information about the formation, such as identification of lithologies which are potentially hydrocarbon producing. Moreover, this desired spectral data may not only be limited to that of natural gamma rays for example, but also may be desired for the gamma ray spectra caused by bombardment of the formation with the aforementioned pulse neutron sources.

Prior art well logging systems for conducting time spectral analysis of nuclear particles have conventionally included a subsurface well logging instrument to traverse a well borehole. The instrument typically includes a gamma spectrometer including a thallium-activated sodium iodide crystal optically coupled to a photomultiplier tube. A high voltage supply accelerates deuterons into a tritium target, generating a large number of 14.2 MeV neutrons, this pulsed neutron source being activated at repetition rates of 1,000 bursts per second. Subsequent gamma radiation from the formation incident upon and detected by this high resolution scintillation crystal generates a pulse of light which in turn causes the photomultiplier tube to generate electrical pulses each proportional to the gamma ray energy causing the pulse. The scintillation spectrometer, comprised of the detector-photomultiplier tube, is maintained at a low temperature in thermal isolation in a Dewar-type flask.

As the photomultiplier tube generates these electrical signals, a downhole electronic amplifier provides voltage amplification and transmits the detector voltage pulse signals in analog form uphole on a single or multi-conductor logging cable to surface instrumentation for analysis and storage. At the surface, this pulsed information is amplified and routed to an analyzer system for deriving the desired time spectra. The surface analyzer provides a total pulse count and selects pulses within prescribed time windows for separate counting. In one variation on the aforementioned systems, rather than sending the actual analog voltage pulses to the surface from the downhole spectrometer, in some instances systems are provided wherein each pulse is first digitized downhole, and the digitized value of each pulse is transmitted to the surface for analysis.

Well logging systems for measuring neutron absorption in a formation use a pulsed neutron source providing bursts of very fast, high-energy neutrons. Pulsing the neutron source permits the measurement of the macroscopic thermal neutron absorption capture cross-section $\Sigma$, of a formation. The capture cross-section of a reservoir rock is indicative of the porosity, formation water salinity, and the quantity and type of hydrocarbons contained in the pore spaces.

Neutrons leaving the pulsed sosurce interact with the surrounding environment and are slowed down. In a well logging environment, collisions between the neutrons and the surrounding fluid and formation atoms act to slow these neutrons. Such collisions may impart sufficient energy to these atoms to leave them in an exited state, from which after a short time gamma rays are emitted as the atom returns to a stable state. Such emitted gamma rays are labeled inelastic gamma rays. As these neutrons are slowed to the thermal state, they may be captured by atoms in the surrounding matter. Atoms capturing such neutrons are also caused to be in an excited state, and after a short time gamma rays are emitted as the atom returns to a stable state. These emitted gamma rays are labeled capture gamma rays.

The number of capture gamma rays present at any time is directly proportioned to the number of thermal neutrons, i.e., the thermal neutron population. The decay rate of this neutron population is an exponential function, and is defined by specifying the time required for the thermal neutron population to decrease to one-half. This time is referred to as a neutron "half-lifetime." While it is actually the neetron lifetime that is measured, the more useful parameter is the capture cross-section. Capture cross-section and neutron lifetime are inversely related, with capture cross-section being a measure of the rate at which thermal neutrons are captured in the formation. Analysis of formation in this manner is referred to as "neutron decay analysis."

The measurement of neutron population decay rate is made cyclically. The neutron source is pulsed for 40-60 microseconds to create a neutron population. Since neutron population decay is a time-related function, only two time referenced gamma ray count measurements are necessary. The capture gamma rays are normally detected from time intervals that are 400-600 microseconds and 700-900 microseconds after each neutron burst. As the neutron source is pulsed and the measurements made, the subsurface well logging instrument is continuously pulled up the borehole.

The recorded log consists of four curves or tracks on a plotter. The capture gamma rays measured during the first measurement time period are recorded on one track. The capture gamma rays measured during the second measurement time period are recorded on a second track. On the third and fourth tracks, there are recorded a monitor of the neutron source output and the calculated capture cross-section. Capture cross-section is continuously calculated from the measurements made during the two measurement time periods.

Along with the thermal neutron log, an epithermal neutron log may be simultaneously recorded. Also, casing collars may be recorded.

Detailed discussion of such a digital well logging system as well as general theoretical background as to such logging operations may be found in U.S. Pat. Nos. 3,379,882 and 3,379,884 which issued to Arthur H. Youmans and each of which is assigned to the assignee of the present invention, both of which are incorporated herein by reference for all purposes.

The prior art nuclear well logging systems just described, through proving to be a very valuable tool in oil and gas exploration, have suffered from numerous deficiencies. First, with respect to the analog systems which transmitted analog voltage pulses form the downhole spectrometer to the surface corresponding to each detected gamma ray, serious problems were encountered in pulse distortion and degradation due to limited band width on the conventional logging cables. Even with the previously described systems incorporating downhole digitization of each spectrometer pulse in an effort to avoid this pulse distortion, the system still transmitted the digital values for each pulse uphole, resulting in extremely slow system throughout. Due to the downhole instrumentation constraints of high temperature environments, low power availability, logging tool size constraints, and low signal-to-noise ratios, the approach of deriving downhole spectra was largely thought to be impractical if not impossible. Nevertheless, a well logging system and particularly a nuclear well logging system was highly desired which not only solved the pulse distortion and throughput problems, but provided better logging cable utilization which did not require the dedication of logging cable conductor time to sending the actual parameter values for each detected gamma ray pulse. It was further highly desirable to provide a nuclear well logging system with improved resolution, statistical accuracy, calibration and calibration maintenance characteristics. Still further, such a system was highly desirable which could, at the same time, provide for programmed downhole system flexibility as well as the opportunity for operator adjustment of parameters such as those affecting spectral generation including discriminator levels, gate positions, source tracking, and temperature correction, as well as data manipulation under control from the surface or subsurface. Again still further, such a system was highly desirable which could accumulate both inelastic and capture gamma radiation and utilize such accumulations in the determination of formation parameters. The present invention is directed to achieving these ends and in the promotion of consistent reproducible well logging spectral data at the surface.

SUMMARY OF THE INVENTION

In accordance with the present invention, a computer-based well logging system and method is provided for acquiring nuclear well logging data, including derivation in a downhole logging instrument of spectral information relating to the time-distribution of nuclear particles detected within a subsurface earth formation.

The system includes a subsurface well logging instrument suspended within and adapted to traverse a well borehole and a surface system interconnected to the instrument by a suitable communication link such as a single or multi-conductor logging cable.

The surface system desirably includes a master controller or computer with associated storage or memory, one or more forms of visual display such as a plotter, an input/output device for communicating with the controller, and a conventional modem for communications interface between the surface system and the instrument. The surface system serves the purpose of acquisition, storage, and display of data generated by the instrument as well as providing data and command control functions to the instrument via the communication link.

As the subsurface instrument traverses the well borehole, a depth indicator provides signals indicative of the depth and rate of travel of the instrument within the borehole. In response thereto, the controller produces periodic depth command signals at prescribed depth intervals such as every quarter of a foot (four samples per foot or in the alternative twenty samples per meter) which may be used as command signals conveyed to the instrument for purposes of retrieving data generated by the instrument within each such depth interval.

The subsurface instrument includes a long-spaced (LS) and short-spaced (SS) detector for detecting natural or induced gamma ray emissions from subsurface formations which produce electrical pulses. Each pulse corresponds in time with the incidence of a corresponding gamma ray on the detector and has an analog voltage amplitude correlative of the gamma ray. If the system is employed for spectral analysis of neutron-induced gamma rays, the instrument will further include a neutron source for repeatedly inducing bursts of neutrons into the formation at a preselected frequency such as 1,000 KHz.

A multi-channel scale (MCS) section is provided within the instrument for accumulating these indications of the time of occurrence of detected gamma ray pulses occurring during prescribed time intervals and conveyed from the detector to the section. A memory within the analyzer is divided into one or more pluralities of memory locations, each memory location uniquely corresponding sequentially to a different time window or channel having a preselected discrete time width and employed to accumulate a count of gamma rays occuring within the particular time window during a preselected time interval. In the preferred embodiment, these windows will be referenced to the time of firing of the aforementioned neutron source.

The MCS section includes a channel generator, spectrum accumulator and central processor unit (CPU). In its overall operation, the MCS section accumulates spectral data in the spectrum accumulator by using a channel number generated within the channel generator and associated with a pulse as an address for a memory location in the spectrum accumulator. After all of the 5 channels have had their data accumulated, the CPU reads the spectrum, or collection of data from all of the channels, and sends the data to a modem which further transmits such data to the surface apparatus. The channel generator further generates synchronized signals which control the pulse frequency of the pulse neutron source. The CPU further generates and communicates control commands which define certain operational parameters of the system.

The MCS section thus automatically accumulates counts for each of these spectra by the aforementioned address code generation. A high speed first-in-first-out buffer interposed between the channel generator and spectrum accumulator temporarily stores this arrival time data for later accumulation in the analyzer memory to enhance data acquisition rate of the analyzer. A direct memory access is provided between the CPU and the memory of the spectrum accumulator. In this manner, the CPU accesses the spectral data thus being acquired by the memory of the spectrum accumulator, either under downhole or surface control as desired, such as upon occurrence of depth interrupt commands, without affecting acquisition of the spectral data.

The CPU will periodically acquire this spectral data from the spectrum accumulator memory as desired for transmission to the surface, storage in CPU memory, or downhole analysis, also as desired.

A feature of the present invention is the flexibility provided by the instrument CPU, either alone or in response to surface-generated commands form the surface CPU, in controlling and defining the various spectra being generated downhole as well as the related parameters for accomplishing this function.

A further feature of the present invention is the ability of such instrument to provide time-distribution spectra over the entire time interval between source firings, such spectra including both the gamma radiation produced from the inelastic scattering and capture of neutrons from said neutron source. The instrument is further capable of measuring background gamma radiation as part of the data collection process. The spectra so generated by the instrument may be analyzed and processed to derive many parameters indicative of formation and borehole conditions. For example, the ratio of inelastics in the short to long spaced detectors (RIN) may be derived from such spectra. RIN is primarily sensitive to changes in the borehole geometry. The ratio of the inelastics to the captures in the short-spaced detector (RICS) may also be derived from such spectra. RICS is primarily sensitive to formation porosity. An indication of the presence of gas in a fluid filled formation can be determined from a comparison of RICS and RATO, the ratio of captures in the short to long spaced detectors. Still further, the macroscopic thermal neutron absorption capture cross-section may be derived from such spectra. From the capture-cross section a quantitative measure of the repeatability of such measures may be derived (MSD), from which the weight of a filter for the capture cross-section values may be controlled.

These and other features and advantages of the present invention can be understood from a reading of the following detailed specification with reference to the following drawings:

DETAILED DESCRIPTION OF THE PREFERRED EMBODIMENT

Figure 1:
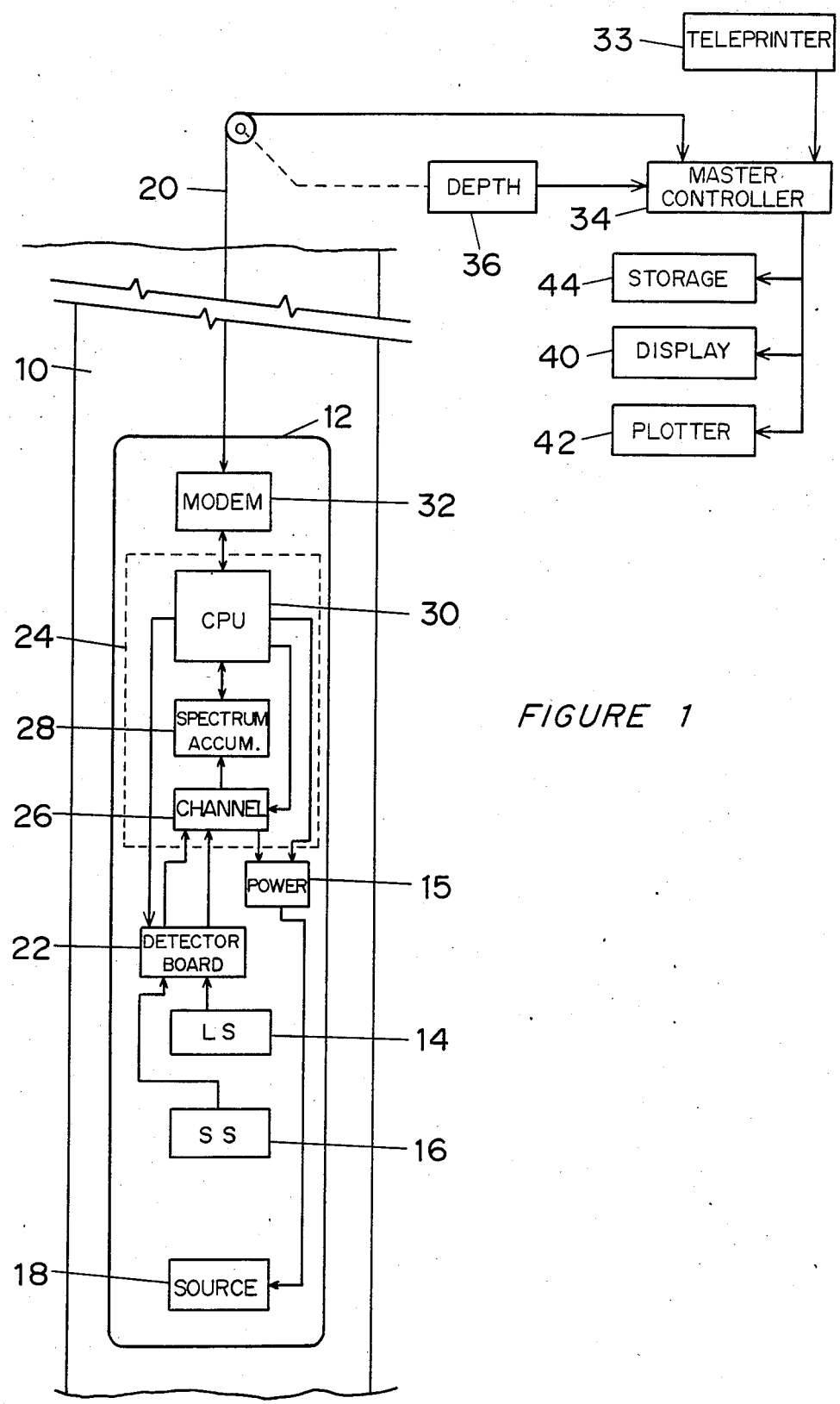
FIG. 1 is an overall schematic diagram of the nuclear well logging system of the present invention.

Referring now to the drawings in more detail, and particularly to FIG. 1, there is illustrated a nuclear well logging configuration in accordance with the present invention. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulsed neutron source 18. In the preferred embodiment, LS and SS detectors 14 and 16 are comprised of bismuth-germanate (DGO) crystals coupled to photomultiplier tubes. To protect the detector systems from the high temperatures encountered in boreholes, the detector system may be mounted in a Dewar-type flask. Also, in the preferred embodiment, source 18 comprises a pulsed neutron source using a D-T reaction wherein deuterium ions are accelerated into a tritium target, thereby generating neutrons having an energy of approximately 14 MeV. The filament current and accelerator voltage are supplied to source 18 through power supply 15. Cable 20 suspends instrument 12 in well 10 and contains the required conductors for electrically connecting instrument 12 with the surface apparatus.

The outputs from LS and SS detectors 14 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. As will be explained later, MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Also to be explained later is the further function of channel generator 26 in generating synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. Teleprinter 38 is coupled to master controller 34 to allow the system operator to provide selected input into master controller 34 for the logging operation to be performed by the system. Display unit 40, plotter 42 and mass storage unit 44 are also coupled to master controller 34. The primary purpose of display unit 40 and plotter 42 is to provide visual indications of the generated logging data as well as systems operations data. Storage unit 44 is provided for storing logging data generated by the system as well as for retrieval of stored data and system operation programs.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude functionally related to the energy of the particular gamma ray is delivered to detector board 22. It will be recalled that detector board 22 amplifies each pulse and compares them to an adjustable discriminator level, typically set at a value corresponding to approximately 100 KeV. If such pulse has an amplitude corresponding to an energy of at least approximately 100 KeV, the voltage pulse is transformed into a digital signal and passed to channel generator 26 of MCS section 24.

Figure 2:
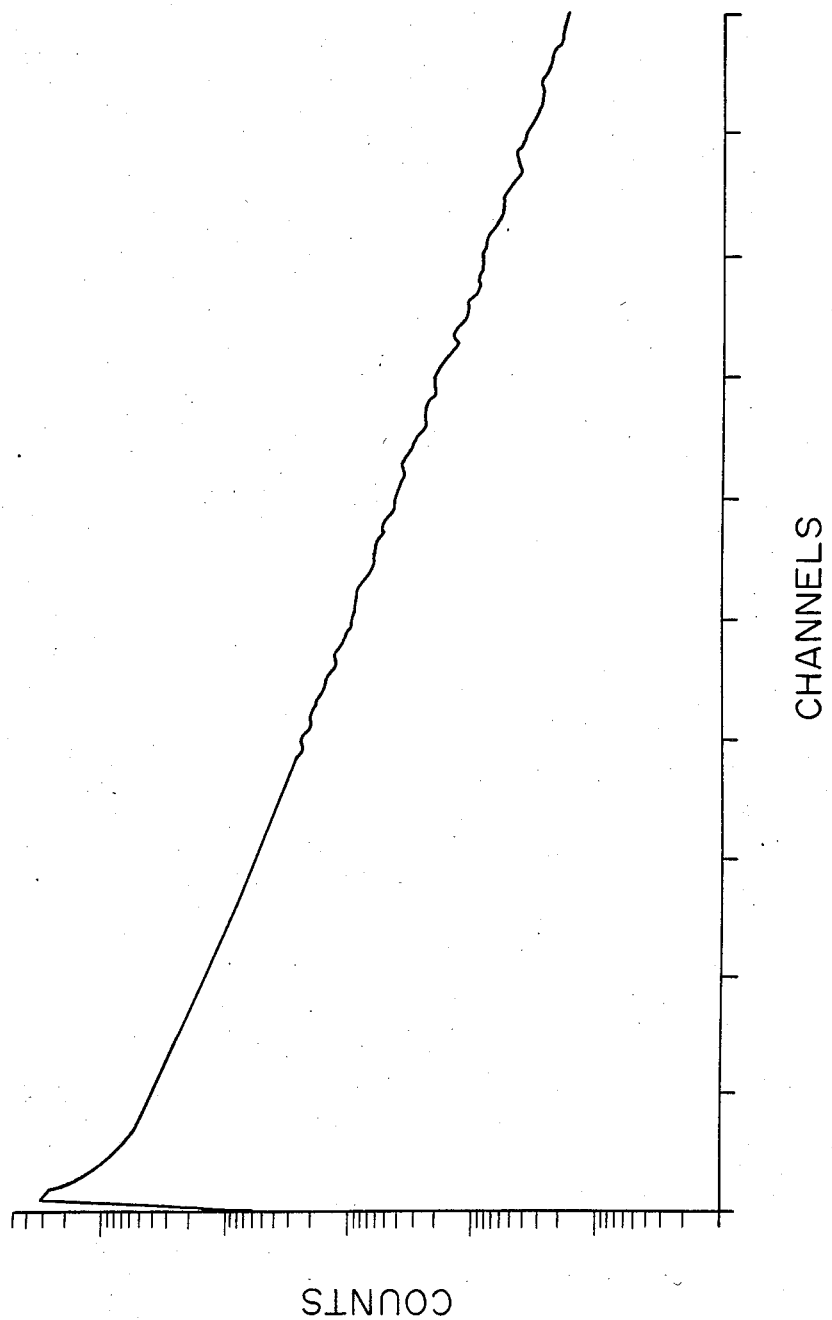
FIG. 2 is a representative display of time distribution analysis data acquired by a well logging system in accordance with that illustrated in FIG. 1.

The purpose of MCS section 24 may be more clearly understood with the reference to the illustrative gamma ray spectrum indicated in FIG. 2. From the foregoing, it will be recalled that each element in the formation when excited by high energy neutrons, will emit gamma radiation having energies characteristic of the particular element. In like manner, the time distribution of the occurrence of each of these gamma ray pulses also yields extremely valuable information. As but one example, in the system being described, a certain amount of "dead time" is experienced due to finite time required for the processing of gamma ray pulses and the like which adversely affect the spectra being derived. Derivation of a gamma ray time distribution spectrum would enable corrections for the dead time in the spectra. As another example of the use of gamma ray time distribution spectrum, such a spectrum permits inference of the neutron decay spectrum or flux in the formation of the gamma rays thus received due to the source burst. This information, in turn, will permit inferring the macroscopic neutron absorption coefficient or capture coefficient.

From the foregoing, it will thus be noted that it is desirable to have the capability of generating time distribution spectra for the gamma rays being detected by LS and SS detectors, 14 and 16, and thus MCS section 24 is provided for this purpose. FIG. 2 indicates a typical time distribution spectrum generated by MCS section 24, in which the coordinate represents the number of gamma rays being detected by a detector at time intervals corresponding to discrete channel numbers indicated along the abscissa. As source 18 is triggered and becomes increasingly active, the number of neutrons irradiating into the surrounding formation per unit of time increases until the maximum burst of source 18 is reached, after which the count rate of such neutrons decreases. It will be expected that the gamma ray count detected by a detector would observe a similar peak as in fact evidenced by the peak in FIG. 2. The abscissa will conventionally be divided into a preselected number of channels which, in the data depicted in FIG. 2, is arbitrarily selected as 100, with each increasing channel number corresponding to a discrete window of time occurring increasingly farther from a time reference point.

As aforementioned, the purpose of MCS section 24 is thus, in part, to form these time distribution spectra for the detected gamma rays being delivered to MCS section 24 from LS and SS detectors 14 and 16. Prior to discussing MCS section 24 in greater detail, it will be helpful to consider in general the manner in which these spectra are thus created. It will be recalled that as each individual gamma ray is detected by either LS or SS detector 14 or 16, a corresponding voltage pulse is sent to detector board 22 where the pulse is amplified and compared to a discriminator level. If the amplitude of such pulse is greater than such discriminator level, the pulse is transformed into a digital signal and sent to channel generator 26. In channel generator 26, circuitry is provided for detecting the time of occurrence of these voltage pulses relative or referenced to a start time functionally related to the time of firing or energizing of source 18. Thus, for each such voltage pulse and corresponding detected gamma ray, a digital representation of the time of occurrence of the pulse is accordingly generated in channel generator 26.

Further discussing the time spectrum generating function of MCS section 24, such as that illustrated in FIG. 2, it should be remembered that useful information is provided by knowing the count of the total gamma rays detected by LS and SS detectors 14 and 16 at preselected discrete times or time windows relative to a start or reference time. Thus, MCS section 24 is further provided with appropriate time references for generating digital words corresponding to the time occurrence of each detected gamma ray pulse relative to a start time. This time period over which a desired time spectrum is to be generated may be divided into a plurality of discrete time windows in corresponding channel numbers. For example, if it is desired to derive a time spectrum of detected gamma rays over a 1000 microsecond interval (corresponding to a 1 KHz repetition rate for source 18), this 1000 microsecond interval may be divided into 100 consecutive channels 1–100, each of which is 10 microseconds in width. Appropriate memory locations may be provided in a suitable memory in the circuitry of spectrum accumulator 28, each location corresponding to a different one of these time channels. The purpose of each such location is to accumulate a running count or total of the occurrence of the particular digital word assigned to that memory location and corresponding uniquely to one of the time windows or channels. Each time a gamma ray is detected by a detector, the time of occurrence relative to a start time is formed into a digital word corresponding to one of the time channels or memory locations. That memory location is thence incremented by one. Accordingly, as additional gamma rays are detected and their corresponding arrival times digitized and stored in their appropriate memory locations or channel numbers, a total count will be generated in each such memory location corresponding to gamma rays occurring within that time window interval and within the time allotted for generation of the time spectrum. By interrogating each of the memory locations or channels consecutively in the memory of MCS section 24, a visual indication such as that of FIG. 2 may be derived indicating the time distribution of occurrence of gamma rays.

Again referring to FIG. 1, the general purpose of MCS section 24 may now be summarized. In addition to deriving unique discrete digital representations of the time of arrival of each gamma ray pulse detected by the detectors and referenced to appropriate time references, MCS section 24 will accumulate a total of digital counts in memory locations within spectrum accumulator 28, each location corresponding to the number of gamma rays detected as of the interrogation occurring within the time window corresponding to the locations relative to a reference time. Thus, time spectra may be accumulated and derived downhole as desired, thereby avoiding the approach known to the prior art wherein the actual detected gamma ray pulses either in analog or digitized form are transmitted up cable 20 for analysis at the surface. Still referring to FIG. 1, CPU 30 may at appropriate times internally generate or in response to commands on the cable 20, interrogate spectrum accumulator 28 to retrieve spectral data as desired for transmission to the surface. This data will be delivered by CPU 30 to modem 32 for delivery to the surface on cable 20. In the alternative, however, it is contemplated that once the spectra are thus derived, this spectral data may be stored in the memory of CPU 30 for additional processing prior to delivery to the surface.

It will be appreciated that due to the presence of downhole computing and control capability afforded by MCS section 24, an extremely powerful and flexible logging system is thus provided which is not limited to particular configurations. Thus, the details of the spectra being generated by MCS section 24 may be adaptively changed by CPU 30 through parameters delivered to CPU 30 in response to either software program control resident in the memory of CPU 30 or as a function of control information delivered on the cable 20 from the surface. Thus, as but one simple illustration, the discriminator widths of voltage pulse signal threshold levels and the like employed by MCS section 24 may be varied at will in response to control from the CPU 30. The flexibility afforded by this feature will become more apparent hereinafter wherein a more detailed description of MCS section 24 is provided.

Yet an additional extremely important feature of the present invention relates to the ability of MCS section 24 to derive such spectra automatically wherein by means of a direct memory access, CPU 30 may interrogate the memory of spectrum accumulator 28 to retrieve spectral data for analysis or transmission without interrupting the spectral acquisition process itself. Without such feature, conventionally while CPU 30 is retrieving spectral data from the memory, ability of the analyzer to derive further portions of the spectra would thus be inhibited inasmuchas the memory, while accessed by CPU 30 is thus not available for storage of just-derived additional spectral data by spectrum accumulator 28. High speed buffering in conjunction with the direct memory access enables this independent spectral generation simultaneously along with retrieval of such spectral information and additional processing thereof as desired, such buffering to be also described later in greater detail.

Figure 3:
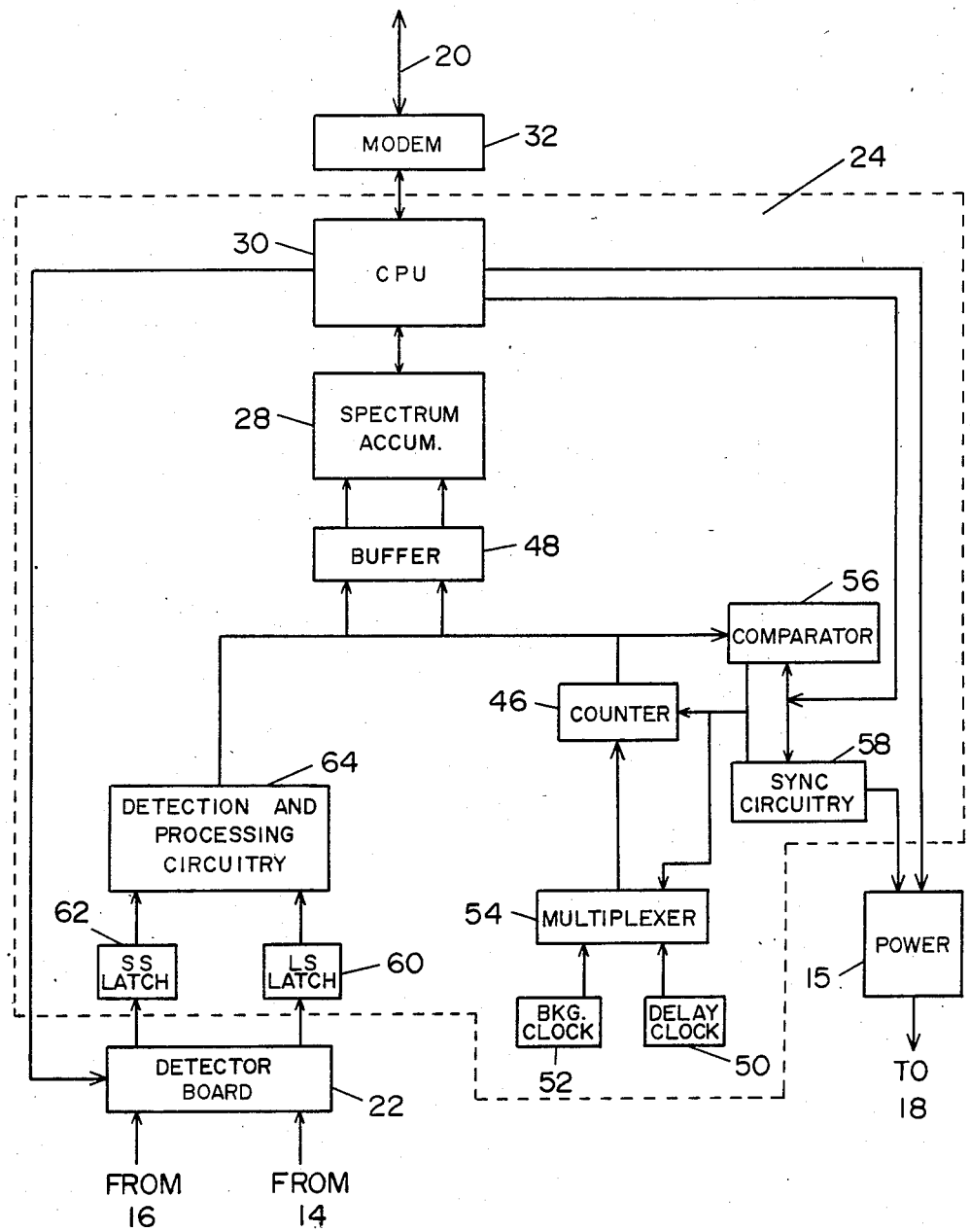
FIG. 3 is a simplified block diagram providing a more detailed representation of the well logging instrument circuitry illustrated in FIG. 1 and in particular, that of the multi-channel scale section.

Referring now to FIG. 3, an overall discussion of MCS section 24 and its operation will be given. It will be recalled that the purpose of MCS section 24 is to accumulate a total count of gamma ray pulses occurring in each of a preselected number of discrete time windows so as to generate the desired time spectra. To accomplish this, a series of sequential 8-bit words corresponding to memory address locations in spectrum accumulator 28 will be generated, in order, within counter 46 in response to frequency pulses from a reference clock. MCS section 24 is provided with two such reference clocks, decay clock 50 and background clock 52. Considering for the moment only decay clock 50, such clock being utilized in determining the timing of the discrete gating during the accumulation of the gamma ray counts resulting from the pulsing of source 18, decay clock 50 generates a reference pulses signal of preselected a frequency, the period between pulses being the desired width of the discrete time window. In the preferred embodiment, decay clock 50 has a reference frequency of 100 KHz, that is, a period of 10 microseconds. The frequency pulses from decay clock 50 are passed through multiplexer 54, which allows only the passage of the desired reference pulse, in this case the frequency pulse from decay clock 50, to counter 46. Upon detection of such frequency pulse by counter 46, the 8-bit memory address word generated therein is incremented by one. For example, after detection of the first decay clock frequency pulse, the 8-bit output from counter 46 may look like 00000000. After detection of a second pulse, the 8-bit output is incremented by one to look like 00000001. This incrementing will continue until a preselected count limit is detected by comparator 56, that limit being preferably a decoded valve of 100 for the decay count. When such limit is detected, comparator 56 generates a signal which is passed to sync circuitry 58. In response to this signal sync circuitry 58 generates a sync signal which is further passed to counter 46 and power source 15. In response to this sync signal the count in counter 46 is reset to 00000000 and a burst sequence from source 18 is initiated in power source 15.

To summarize the above timing of MCS section 24, counter 46 increments an 8-bit memory address word in response to reference pulses from decay clock 50, a reference frequency generator. After detection by comparator 56 of a preselected increment limit, comparator 56 generates a signal which is sent to sync circuitry 58. In response to such signal, sync circuitry 58 generates a sync signal which initiates the resetting of the count in counter 46 and the burst sequence of source 18.

In the operation of the above timing sequence, a background data gathering process, such as is provided in U.S. Pat. No. 4,540,883 issued Sept. 10, 1985, by Russel R. Randall, assigned to the assignee of the present invention and incorporated herein by reference for all purposes, may be utilized in conjuction with background clock 52 in the following manner. After detection by CPU 30 of the passage of a preselected number of decay cycles, this preselected number being preferably 28, CPU 30 may instruct comparator 56 to add to the increment limit, the preferred increment increase being 20. In other words, upon instruction from CPU 30, counter 46 will be allowed to increment to a decoded valve of 120 instead of 100. Upon detection of this instruction signal from CPU 30, comparator 56 further instructs multiplexer 54 to pass the frequency pulses from background clock 52 to counter 46. In the preferred embodiment, background clock 52 produces a reference frequency of 5 KHz, that is, a period of 200 microseconds. Once this new increment limit is detected by comparator 56, the system is reset to the original decay cycle.

Further explaining the preferred timing, it will be remembered that decay clock 50 has a preferred reference frequency of 100 KHz, background clock 52 has a preferred reference frequency of 5 KHz and comparator 56 is preferably set to detect a decoded valve of 100 increments during the decay measurements with an extra 20 increments preferably added during the background measurements. Upon initiation of the first burst sequence of source 18, counter 46 is incremented in response to decay clock 50 until a decoded valve of 100 increments is detected by comparator 56. This 100 increments corresponds to a 1000 microsecond decay cycle having 100 ten microsecond discrete time windows. Upon detection of this 100 increment limit by comparator 56, counter 46 is reset and the burst sequence of source 18 is reinitiated. Upon the passage of the twenty-eighth decay cycle, that is, after the twenty-eighth 1000 microsecond interval, the limit in comparator 56 is extended to a decoded valve of 120 and multiplexer 54 passes the reference frequency of background clock 52 to counter 46, which now increments in response to the 5 KHz reference signal. Counter 46 is then allowed to increment to a decoded valve of 120, at which time the system resets to the previously described timing of the decay cycle. Stated another way, counter 46 will increment to 100 twenty-eight times, thereby producing 28 decay spectra. Following the twenty-eighth decay cycle, counter 46 will increment an extra 20 two-hundred microsecond intervals, thereby producing a single background spectrum. Following this background cycle, the system is reset to again detect the 28 decay cycles followed again by the background cycle and so forth throughout the measurement interval.

These 8-bit memory address words so generated by the above described timing system are in turn communicated through buffer 48 to spectrum accumulator 28 wherein such 8-bit words are altered and accumulated to reflect the detection of gamma rays by either LS or SS detector 14 or 16 as will be described below. Also communicated through buffer 48 to spectrum accumulator 28 are signals generated by detection and processing (DAP) circuitry 64 in response to the signals generated by the impingment of gamma radiation upon LS and SS detectors 14 and 16. The purpose for and generation of such DAP signals will also be described below.

Buffer 48 is preferably of a high speed first in-first out (FIFO) type. It is a significant feature of the presently described system that the memory in spectrum acumulator 28 which accumulates the desired time spectra may be accessed by both CPU 30 as well as by the remaining portions of MCS section 24. If this memory was, at a given time, being accessed by CPU 30 data acquisition by MCS section 24 would thus be impeded reducing throughput of the system inasmuchas the data acquisition capability of MCS section 24 would have to be held in abeyance until CPU 30 relinquishes control of the memory. Otherwise data valves being generated by MCS section 24 would be lost during CPU 30 control of the memory inasmuchas this data would have nowhere to be stored. Accordingly, one of the functions of buffer 48 is to provide temporary storage for the data being derived by the rest of the MCS section 24 until such time as this data can be stored in the appropriate memory locations in the memory of spectrum accumulator 28.

Referring back to the generation of DAP signals from DAP circuitry 64, it will be recalled that detector board 22 generates digital representations in response to voltage pulses generated by LS and SS detectors 14 and 16 indicating the impingement upon such detectors of gamma radiation. Those digital signals generated in response to voltage pulses from LS detector 14 are latched into DAP circuitry 64 through LS latch 60, while those digital signals generated in response to voltage pulses from SS detector 16 are latched into DAP circuitry 64 through SS latch 62. LS and SS latches 60 and 62 are provided for temporarily holding their respective signals until such time as DAP circuitry 64 is available for processing. In response to these signals DAP circuitry 64 generates signals indicative of the occurrence of the impingement of gamma radiation upon a specific detector. These DAP signals, as previously mentioned, are then passed through buffer 48 to spectrum accumulator 28 for further processing.

Upon reaching spectrum accumularor 28, the DAP signals alter the eighth bit of the 8-bit word currently residing in spectrum accumulator 28 to indicate the specific detector to which such pulse in attributable. Such altered 8-bit word is then latched into the memory of spectrum accumulator 28, wherein the occurrence of such altered 8-bit word is accumulated within the corresponding memory address location. For example, assume during a first time interval a first signal is generated by DAP circuitry 64, such signal indicating the impingement of a gamma ray upon one of the detectors. Assume further during a following time interval a second signal is generated by DAP circuitry 64, such signal indicating the impingement of a gamma ray upon the other detector. Assuming still further that the 8-bit word residing in spectrum accumulator 28 during the first time interval is 00000000, upon detection by spectrum accumulator 28 of the first DAP signal such 8-bit word will be altered to 10000000 and latched into the corresponding memory location for accumulation. When such memory location is read by CPU 30, it will show one count occurred in the first detector during the first time interval. Likewise assuming still further that the 8-bit word residing in spectrum accumulator 28 during the second time interval is 00000001, upon detection of the second DAP signal such 8-bit word will be altered, or rather remain unaltered, to 00000001 and latched into the corresponding memory location for accumulation. When this memory location is read by CPU 30, it will show one count occurred in the second detector during the second time interval.

It will be recalled that, after all of the channels have had their data accumulated, CPU 30 reads the spectrum, or collection of data from all of the channels and either stores such data in the internal memory of CPU 30 or sends such data to modem 32 for transmission to the surface. In the preferred embodiment, CPU 30 reads such spectrum in response to the movement of instrument 12 of a preselected length interval, preferably ¼ foot (four samples per foot or in the alternative twenty samples per meter). As will be recalled, depth controller 36 generates signals sent to master controller 34 indicating the movement of instrument 12 within well 10. Upon detection by master controller 34 of the movement of instrument 12 of ¼ foot, master controller 34 generates a signal which instructs CPU 30 to read such data and either store such data within its internal memory or transmits such data uphole. Such data may further be processed, for example, to produce a time distribution spectrum as shown in FIG. 2.

CPU 30, as previously mentioned, also implements system operation programs thereby controlling many parameters of the well logging operation. Specifically, CPU 30 performs several functions including communication of data and commands between the surface and subsurface; setting of such operating parameters as the discriminator level of detector board 22, the filament current supplied to source 18, and the accelerator voltage supplied to source 18; and starting and stopping of sync circuitry 58 including control over the background cycle. Such examples of the controlling function of CPU 30 are for illustrative purposes only and in no way limit the invention herein described.

The time distribution spectra so generated by the aforedescribed system allow greater flexibility in utilization of such gathered data. For example, by utilizing the preferred timing, counts of the impingement of gamma radiation are accumulated over 10 microsecond intervals, thereby improving upon the resolution and statistical accuracy of prior systems. Further, such data accumulation over a plurality of discrete intervals covering the entire interval during and between bursts of the neutron source allows the use of both the inelastic and capture portions of the spectrum, or any other portion thereof, thereby greatly increasing the amount of information available for processing and greatly expanding the ability to determine borehole and formation conditions.

As but one example of the use of such accumulated data to predict borehole conditions, the inelastic portion of the spectrum may be utilized to generate parameters highly sensitive to changes of the borehole. This result stems from the shallow depth of investigation available from the inelastic gamma radiation. The borehole conditions most evidenced by such parameters, therefore, are those related to changes in the geometry of the borehole.

One such borehole parameter is determined by utilizing the counts of the impingement of primarily inelastic gamma radiation upon the short-spaced detector. One embodiment of this parameter, RIN, is the ratio of the primarily inelastic counts upon the short-spaced detector to the primarily inelastic counts upon the long-spaced detector. RIN is highly sensitive to borehole geometry changes, and may be used as an indicator of changes in the borehole, a diagnostic for system irregularities and an indicator of borehole effects on other parameters.

In utilizing the preferred timing of the system as described above, RIN is determined by first accumulating counts of the impingement of gamma radiation upon the short-spaced detector during the 100 microsecond interval following the initiation of each neutron burst, that is, during the first 10 microsecond intervals. The short-spaced count is then normalized to remove the effects of variations in the neutron bursts by taking the ratio of the short-spaced count to the long-spaced count over the same time interval. It should be noted that such normalization may be accomplished by any measure capable of reflecting such variations in the neutron bursts. By utilizing another inelastic count to provide such normalization, however, RIN is primarily sensitive to changes in borehole geometry.

Such inelastic data is also useful in predicting formation conditions such as formation porosity. One such formation parameter is also determined by utilizing the counts of the impingement of primarily inelastic gamma radiation upon the short-spaced detector. One embodiment of this parameter, RICs, is the ratio of the primarily inelastic counts upon the short-spaced detector to the primarily capture counts upon the short-spaced detector. Once again utilizing the preferred timing, RICS is determined in the same manner as RIN except the short-spaced inelastic count is normalized by a short-spaced capture count accumulated over the 900 microsecond interval preceeding the initiation of each burst, that is, from the eleventh to the one hundredth 10 microsecond interval. It should again be noted that such normalization may be accomplished by any measure capable of reflecting variations in the neutron bursts.

The basis for the sensitivity of RICS to formation porosity arises from the fact that the inelastic gamma radiation count depends upon the number of heavier elements present in the formation. If a formation is less porous, that is, has a greater density of heavier elements, more inelastic gamma radiation will be produced due to the higher number of heavier elements to collide with. Conversely, if the formation is more porous, that is has a lower density of heavier elements, fewer collisions will occur and less inelastic gamma radiation will be produced.

RICS may further be utilized in conjunction with another formation sensitive parameter to indicate the presence of gas in a fluid-filled zone. The other parameter is preferably dependent upon capture gamma radiation. One such other parameter is RATO, the ratio of primarily capture gamma radiation upon the short-spaced detector to primarily capture gamma radiation upon the long spaced detector. Again utilizing the preferred timing, RATO is determined by first accumulating counts of the impingement of gamma radiation upon the short-spaced detector during the interval from 200 microseconds to 400 microseconds following the initiation of each source burst, that is from the twenty-first to the fortieth 10 microsecond interval. This first accumulation is then normalized by taking the ratio of this first accumulation to the long-spaced count over the interval from 200 microseconds to 1000 microseconds following the initiation of each source burst, that is from the twenty-first to the one hundreth 10 microsecond interval.

RATO is sensitive to the hydrogen density in the formation since the production of capture gamma radiation is dependent upon such hydrogen density. In a gas-filled zone, which has a lower hydrogen density than a liquid-filled zone, RATO will be lower due to this lower hydrogen density. RICS, however, is not sensitive to hydrogen density, and by overlaying the values of RICS and RATO in liquid-filled zone, gas-filled zones can be located when the RICS and RATO values separate. The use of RICS and RATO in conjunction, therefore, provides a good indicator of the presence of gas in a fluid-filled zone.

As previously mentioned, the data so generated by the system herein disclosed may further be utilized to measure the macroscopic thermal neutron capture cross-section, $\Sigma$, of a formation. The $\Sigma$ of a reservoir rock is indicative of the porosity, formation water salinity, and quantity and type of hydrocarbons contained in the pores of such rock. The $\Sigma$ is further one of the more important parameters measured by pulsed neutron capture systems such as herein described, and a quantitative measure of the repeatability of such is highly desirable in determining the statistical validity of such measure.

The basis for such quantitative measure of the repeatability arises from the fact that the system herein disclosed accumulates data in depth increments smaller than the actual depth resolution of such system. The neutron cloud generated by the pulsing of the neutron source extends over tens of inches, while data is accumulated by the system preferably over $\frac{1}{4}$ foot (3 inch) intervals. Thus, for a constant earth formation character, the measured $\Sigma$ from successive $\frac{1}{4}$ foot intervals should be equal.

Any differences between the two $\Sigma$ values, therefore, must be considered deviations. By taking a standard root-mean-square of the two values, a quantitative value of the deviation may be obtained. This calculated deviation may then be filtered to produced a measured mean standard deviation, MSD, over a specified interval. In the preferred embodiment, these calculated deviations are filtered with an 11-point binomial filter, which in this case has a 90% response in a two foot (8 value) interval, to produce the MSD value. This MSD value may then be further processed or compared to a purely statistical standard deviation as an indication of the quality of the $\Sigma$ value so obtained.

This MSD value may further be utilized to control the weight of a filter used for the raw $\Sigma$ values. Such filter is again a 11-point binomial filter with variable weighting. In response to changes of the MSD value outside of preselected statistical limit, the weight of such filter can be made faster thereby decreasing the response time of the filtered $\Sigma$ values to indicate more quickly such changes in the $\Sigma$ values. Large changes in the MSD values are generally caused by zone changes, and the statistical limits of the MSD curve should be adjusted appropriately. By making the weight of such filter faster, the filtered $\Sigma$ values will more accurately disclose such a zone change.

It should here be noted that MSD may be calculated for any parameter generated by a counting log in which data acquisition is made at depth intervals smaller than the depth resolution of the system. Accordingly, it should be clearly understood that the application of the MSD to the measured $\Sigma$ is exemplary only, and is not intended as a limitation on the scope of the present invention.

Thus, there has been described and illustrated new and improved methods for induced gamma ray logging of subsurface formations. However, those skilled in the art will recognize that obvious modifications can be made to the embodiments without departing from the spirit of the present invention.

The embodiments of the invention in which an exclusive property or privilege is claimed is defined as follows:

1. In a well logging method utilizing a counting measurement from a counting log, a method for quantitatively measuring the repeatability of a parameter, wherein said parameter is a function of the counts from said counting measurement, comprising the steps of:
gathering counting data for each of a plurality of vertical depth increments, said increments being less than the vertical depth resolution of said counting log;
deriving from said counting data a value of said parameter for each of said plurality of increments;
deriving from a first and second parameter value a value indicative of the statistical deviation between said first and second values, said first and second values being from consecutive increments;
filtering a plurality of statistical values to generate said quantitative measure of the repeatability of said parameters; and
filtering by use of a variable weighted filter a preselected number of said parameter values, said number being dependent upon said quantitative measure of the repeatability of said parameters, wherein said quantitative measure controls the weight of said filter and said number is preselected as a function of said weight of said filter.

2. The method of claim 1, wherein said step of deriving a value indicative of the statistical deviation comprises the step of taking the root-mean-square of said first and second values.

3. The method of claim 1, wherein said step of filtering said statistical values comprises the step of passing a preselected number of said statistical values through a filtering means.

4. The method of claim 1, wherein said step of gathering counting data comprises the steps of:
detecting the impingement of gamma radiation upon a detector means;
accumulating within a plurality of discrete time intervals the counts of the impingement of gamma radiation upon said detector means; and
totalling within each of said plurality of increments the accumulated counts detected within each of said plurality of discrete time intervals.

5. The method of claim 4, further comprising the step of cyclically irradiating a subsurface earth formation with bursts of high energy neutrons.

6. The method of claim 5, wherein said step of deriving a value of said parameter comprises the step of deriving from said counts occurring within said plurality of discrete time intervals a value of said parameter for each of said plurality of increments.

7. The method of claim 6, wherein said step of deriving a value of said parameter comprises the step of deriving a value of the macroscopic thermal neutron capture cross-section for each of said plurality of increments.

8. The method of claim 7, wherein said step of deriving a value of indicative of the statistical deviation comprises the step of deriving from a first and second value of said macroscopic thermal neutron capture cross-section a value indicative of the statistical deviation between said first and second values.

9. The method of claim 8, wherein said step of deriving a value indicative of the statistical deviation comprises the step of taking the root-mean-square of said first and second values of said macroscopic thermal neutron capture cross-section.

10. In a well logging method utilizing a counting measurement from a counting log, a method for controlling the quality of a parameter, wherein said parameter is a function of the counts from said counting measurement, comprising the steps of:

gathering counting data for each of a plurality of vertical depth increments, said increments being less than the resolution vertical depth of said counting log;

deriving from said counting data a value of said parameter for each of said plurality of increments;

deriving from a first and second parameter value a value indicative of the statistical deviation between said first and second values, said first and second values being from consecutive increments;

filtering a plurality of statistical values to generate a quantitative measure of the repeatability of said parameter; and filtering a preselected number of said parameter values, said preselected number being dependent upon said quantitative measure of the repeatability of said parameters;

wherein said step of filtering said parameter values comprises the step of passing said preselected number of said parameter values through a variable weighting filtering means; and wherein said step of passing said parameter values through a variable weighting filter means comprises the steps of:

defining limits for said quantitative measure of the repeatability of said parameter;

adjusting the weight of said variable weighting filter means in response to the location of said quantitative measure within said limits; and passing a preselected number of parameter values through said filtering means, said number being preselected based upon said weight of said filtering means.

11. The method of claim 10, wherein said step of deriving a value indicative of the statistical deviation comprises the step of taking the root-mean-square of said first and second values.

12. The method of claim 10, wherein said step of filtering said statistical values comprises the step of passing a preselected number of said statistical values through a filtering means.

13. A method of determining the repeatability of a measurement of the macroscopic thermal neutron capture-cross section (Sigma) of subsurface earth formations, comprising the following steps:

traversing said formations with a radioactivity well logging system;

irradiating said formations with bursts of high energy neutrons from said system;

detecting at said systems radiations emanating from said formations in response to said irradiating;

generating counting data for each of a plurality of vertical intervals, said intervals each being less than the vertical resolution of said system;

deriving from said counting data a Sigma value for each of said plurality of intervals;

deriving from Sigma values from first and second of said plurality of intervals a value of the deviation between said first and second Sigma values;

generating from said deviation value a measurement of the repeatability of said Sigma; and filtering by use of a variable weighted filter a number of said Sigma values, wherein said measurement of repeatability controls the weight of said filter and said number of said Sigma values.

14. The method of claim 13 wherein said step of deriving from first and second of said plurality of intervals Sigma values comprises the step of deriving Sigma values from first and second contiguous intervals.

* * * * *